(12) United States Patent
Steeber et al.

(10) Patent No.: US 6,761,264 B2
(45) Date of Patent: Jul. 13, 2004

(54) SLOPED SURFACE LINKS FOR A CONVEYOR BELT

(75) Inventors: Dorian F. Steeber, Anderson, SC (US); Robert C. Beesley, Greenville, SC (US); Olivier P. Duterte, Greer, SC (US)

(73) Assignee: Hartness International, Greenville, SC (US)

( * ) Notice: Subject to any disclaimer, the term of this patent is extended or adjusted under 35 U.S.C. 154(b) by 0 days.

(21) Appl. No.: 10/463,642

(22) Filed: Jun. 17, 2003

(65) Prior Publication Data

US 2003/0213680 A1 Nov. 20, 2003

Related U.S. Application Data

(63) Continuation of application No. 09/915,201, filed on Jul. 25, 2001, now Pat. No. 6,601,697.

(51) Int. Cl.[7] .............................................. B65G 15/42
(52) U.S. Cl. .................................. 198/844.1; 198/699.1
(58) Field of Search ........................ 198/844.1, 699.1, 198/850, 851, 852, 853, 822

(56) References Cited

U.S. PATENT DOCUMENTS

| | | |
|---|---|---|
| 3,664,491 A | 5/1972 | Scanlon et al. |
| 3,777,877 A | 12/1973 | Piper |
| 3,854,574 A | 12/1974 | Theijsmeijer et al. |
| 3,881,592 A | 5/1975 | Stimpson |
| 4,106,764 A | 8/1978 | Tamura |
| 4,500,666 A | 2/1985 | Wada |
| 4,650,066 A * | 3/1987 | Bradbury ..................... 198/832 |
| 4,840,265 A | 6/1989 | Sato et al. |
| 4,925,013 A | 5/1990 | Lapeyre |
| 5,285,884 A | 2/1994 | Polling et al. |
| 5,413,213 A | 5/1995 | Golz et al. |
| 5,427,227 A | 6/1995 | Crandall et al. |
| 5,467,865 A | 11/1995 | Irwin |
| 5,490,589 A | 2/1996 | Golz et al. |
| 5,497,887 A | 3/1996 | Hiebert |
| 5,775,480 A | 7/1998 | Lapeyre et al. |
| 5,904,241 A | 5/1999 | Verdigets et al. |
| 6,026,947 A | 2/2000 | Persson |
| 6,119,848 A | 9/2000 | Hartness, III et al. |
| 6,152,291 A | 11/2000 | Steeber et al. |
| 6,209,716 B1 | 4/2001 | Bogle et al. |
| 6,260,688 B1 | 7/2001 | Steeber et al. |
| 6,334,526 B1 | 1/2002 | Hatton |
| 6,347,699 B1 | 2/2002 | Ramsey |
| 6,364,095 B1 | 4/2002 | Layne et al. |
| 6,565,689 B2 * | 5/2003 | Geib et al. ................. 198/850 |
| 6,571,935 B1 * | 6/2003 | Campbell et al. ........ 198/690.2 |
| 6,601,697 B2 * | 8/2003 | Steeber et al. ........... 198/844.1 |

* cited by examiner

Primary Examiner—Douglas Hess
(74) Attorney, Agent, or Firm—Dority & Manning, P.A.

(57) ABSTRACT

A conveyor belt for transporting objects is provided. The conveyor belt includes a plurality of body members. Also included in the conveyor belt are a plurality of surface platform members that are disposed at one side of the body members. An outside surface of the surface platform member is sloped from a first location of higher elevation to a second location of lower elevation. A rail member is located on the surface platform member and is proximate to the second point of lower elevation. The surface platform member is adapted to support an object that is transported by the conveyor belt.

26 Claims, 5 Drawing Sheets

SLOPED SURFACE LINKS FOR A CONVEYOR BELT

RELATED APPLICATIONS

The present application is a Continuation application of U.S. Ser. No. 09/915,201 filed on Jul. 25, 2001 which issue on Aug. 5, 2003 as U.S. Pat. No. 6,601,697 B2.

TECHNICAL FIELD

This invention relates generally to the field of conveyor belts and apparatuses for moving objects. More particularly, this invention relates to a chain drive which has a sloped surface onto which objects are reliably positioned.

BACKGROUND

Conveying systems are well known in the art and have any number of useful applications, such as the transportation of objects in various stages of manufacturing, storage, and shipping. Typical conveying systems utilize a flat conveying belt, generally formed of interconnected links, driven by motors that engage with the conveyor belt. Such conveying systems are commonly employed in the transportation of manufactured goods and articles. With these typical systems, the motor drives a toothed drive sprocket that engages with complimenting driving recesses or "dogs" formed on the conveyor belt. These drive units can be disposed in any number along the length of the conveyor belt. Such a drive unit and conveyor system is disclosed in U.S. Pat. No. 6,119,848 which is assigned to the assignee of the present invention, and is incorporated herein by reference in its entirety for all purposes.

Link type conveyor belts are sometimes designed in a knuckle/socket joint arrangement wherein one end of the link is a rounded knuckle and the opposite end is a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed at the link's upper surface. The platform member is generally shaped to match the neighboring platform members on other links such that the links can turn while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a platform surface member is disclosed in U.S. Pat. No. 6,209,716 which is owned by the assignee of the present invention and incorporated herein by reference in its entirety for all purposes.

Often times, it is the case that objects move or shift locations on the conveyor belt during transportation. This can be due to vibrations in the operation of the conveying system, centrifugal or tangential forces on the object when the conveying belt enters a curved section, or from simply being hit by other objects placed onto the conveyor belt. One way to prevent objects from moving on the surface of a conveyor belt is to apply a high friction surface element which keeps the objects in place. Such a technique is taught in U.S. Pat. No. 4,925,013 which is incorporated herein by reference in its entirety for all purposes.

Although the application of a friction surface element will minimize the aforementioned problems associated with the transport of goods, it may also create side-effect problems. For instance, an object placed on a high friction surface element will not move to a desired spot on the conveyor belt unless some other mechanical force is provided in which to move the object. Often times it is desired to specifically locate an object on a conveyor belt, and this cannot be accomplished if the object on a high friction surface is not initially placed in the desired location.

Further, it can also be the case in a particular application that a frictional or a high frictional surface is disfavored. This would be true if heavy objects were to be removed from the conveyer belt by use of a bar or other means. Having a heavy object on a high friction surface would necessitate the need to generate increased amounts of force to move the object from the conveyor belt, or would at least impede movement of the object from the belt. Additionally, it could be the case that a particular application requires the object to be positioned at a particular location on the conveyor belt surface. Having a frictional surface would again prevent or impede the movement of the object from one location on the surface platform of the conveyor belt to another.

Other problems associated with conveyor systems include vibration which causes objects to be rotated from one orientation to another. Ways used in the prior art to prevent this include adding guide rails to either side of the conveyor track to keep the object in place. These guide rails are stationary with respect to the moving conveyor track. Although effective, this solution can be impractical in certain parts of the conveying system in which spatial constraints do not allow for the instillation of guide rails.

The prior art provides a conveyor belt and means for impeding movement of an object on or off the conveyor belt. However, the prior art lacks a solution to locating an object at a particular point on a conveyor belt while still preventing the object from falling off of or moving on the surface platform during transport.

The present invention is at least an improvement upon conveyor used in the prior art, and provides a solution to the aforementioned problems associated with prior art conveying systems.

SUMMARY

Objects and advantageous of the present invention will be set forth in part in the following description, or may be obvious from the description, or may be learned from practice of the invention.

One embodiment of the present invention may be a conveyor belt for transporting objects including a plurality of body members. A plurality of surface platform members may be disposed at one side of the body members. An outside surface of the surface platform members slopes from a first location of higher elevation to a second location of lower elevation. A rail member may be located on the surface platform member proximate to the second point of lower elevation. Also, the surface platform member may be adapted to support an object that is transported by the conveyor belt.

Another aspect of the present invention may include an embodiment as previously discussed which further includes a friction gripping element that is located on the outside surface of the surface platform member. Additionally, this aspect of the invention may be further modified to produce an embodiment where the friction gripping element is located at the second location of lower elevation and is proximate to the rail member.

Another variation of the present invention exists in an embodiment as previously discussed where the outside surface of the surface platform member is inclined to cause the indicated sloping.

The present invention may also provide for a conveyor belt that includes in combination a set of interconnected links. The links are adapted to follow a curved pathway, the links include a plastic body with a leading nose portion and integral trailing set of bifurcated legs. The plastic body has sprocket receiving drive indentations disposed on opposite lateral sides of the body. The indentations are for engagement with laterally disposed sprockets which are used for moving the conveyor belt. A surface platform member is disposed on a plastic body. An outside surface of the surface platform member slopes from a first location of higher elevation to a second location of lower elevation. A rail member is located on the surface platform member and is located proximate to the second location of lower elevation. The surface platform member is adapted to support an object that is transported by the conveyor belt.

Another aspect of the present invention includes the embodiment as just discussed which further includes a friction gripping element that is located on the outside surface of the surface platform member. Additionally, another aspect of the present invention exists in this embodiment that further has the friction gripping element located at the second location of lower elevation and proximate to the rail member.

A further aspect of the present invention may include a conveyor belt as previously discussed where the outside surface of the surface platform member is inclined in order to cause the sloping.

Also included in the present invention is an embodiment as discussed above where the body members are further configured with an inclined surface to cause additional sloping of the surface platform members. A further embodiment exists in which an inclined surface negates the slope of the surface platform members. Such an inclined surface could include, for instance, a shim.

Also, the present invention may include an embodiment of a conveyor belt that includes in combination a set of interconnected links that are adapted to follow a curved pathway. The links include a plastic body with a leading nose portion and an integral trailing set of bifurcated legs. The plastic body has sprocket receiving drive indentations disposed on opposite lateral sides of the body for engagement with laterally disposed sprockets for moving the conveyor belt. A surface platform member is disposed on the plastic body. An outside surface of the surface platform member slopes from a first location of higher elevation to a second location of lower elevation. A rail member is located on the surface platform member near an edge of the surface platform member and is proximate to the second location of lower elevation. The surface platform member is adapted to support an object that is transported by the conveyor belt. The outside surface of the surface platform member is inclined to cause the sloping. A friction gripping element is located at the second location of lower elevation and is proximate to the rail member. The friction element may be a plurality of raised projections.

DETAILED DESCRIPTION

Figure 1:
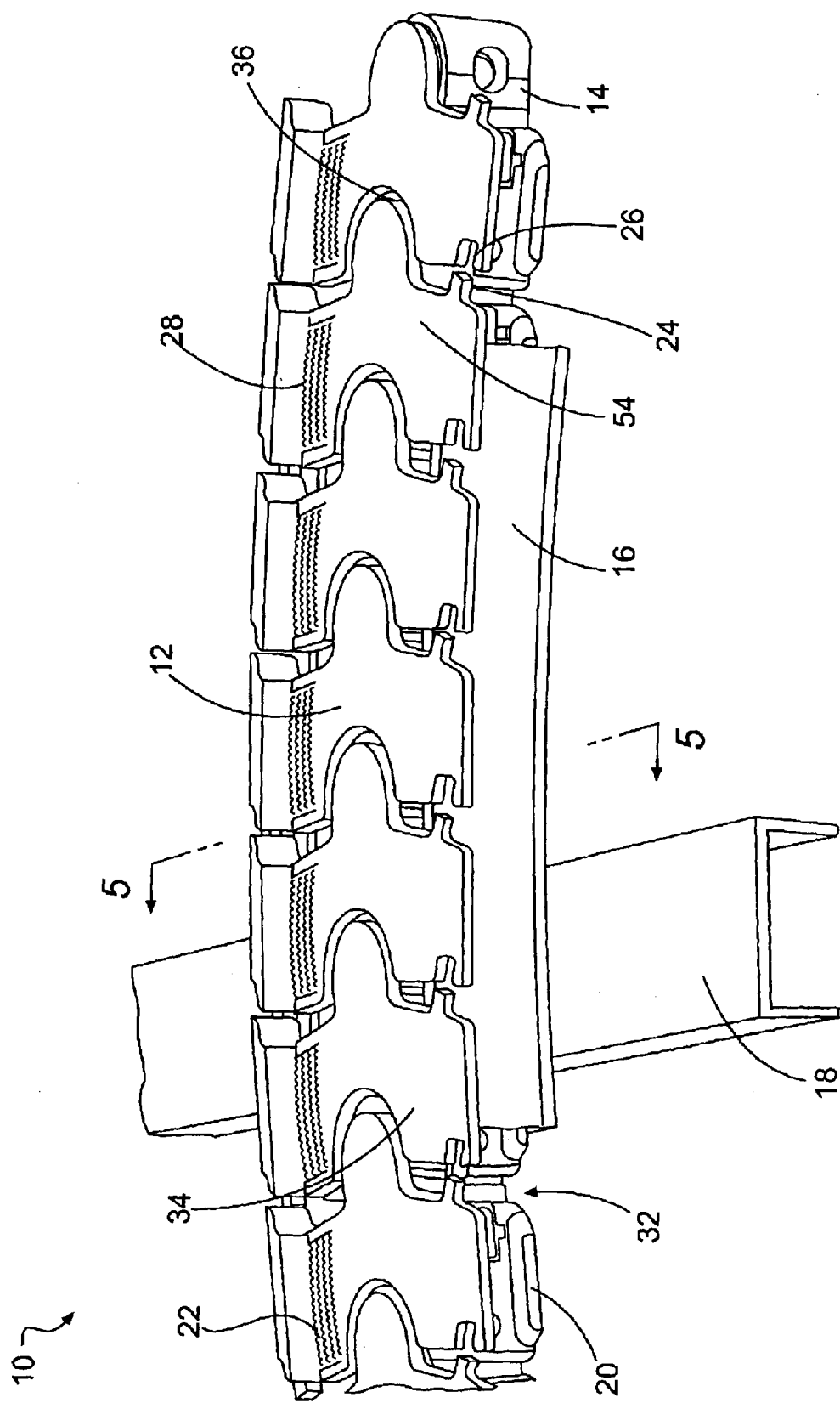
FIG. 1 is a perspective view of an embodiment of the conveyor belt of the present invention. The drawing shows a series of interconnected links that have surface platform members attached thereto in relation to a rail member and a support beam.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Referring to the drawings, FIG. 1 shows one embodiment of a conveyor belt 10 in accordance with the present invention. The conveyor belt 10 includes a plurality of body members 14 that are essentially a series of interconnected links. A plurality of surface platform members 12 are disposed at the upper side of each body member 14. The surface platform members 12 may be separate members individually attached to a respective body member 14, and are shaped such that the leading edge of one surface platform member 12 is configured to be accepted by a trailing edge of the next surface platform member 12. For instance, leading fingers 24 of one surface platform member 12 are configured to be adapted into trailing grooves 26 of the next surface platform member 12. Additionally, a nose portion 30 of one surface platform member 12 is adapted to fit within a void 36 of an adjacent surface platform member 12.

Articles are placed on top of the surface platform members 12 and are conveyed as the plurality of body members 14 move along supporting structure 16. The body members 14 are fitted with flanges 20 on either end in order to ride a supporting structure 16. Drive indentations 32, sometimes known as "drive dogs", are provided between the flanges 20 and the interconnected body members 14. A drive wheel (not shown) engages the drive indentations 32 and propels the conveyor belt 10 along the supporting structure 16.

A set of bifurcated legs 34 on the surface platform members 12 form a void 36 into which the nose portion 30 of an adjacent surface platform member 12 can mate. The conveyor belt 10 may curve along a curved section of supporting structure 16 due to the loosely mated nose portion 30 and void 36. Also, the loose mating connection between the leading fingers 24 and the trailing grooves 26 allow for substantial conveyor belt 10 curvature. Providing sufficient spacing thus allows for a substantially continuous transport surface along the length of the conveyor belt 10. As can be seen in FIG. 1, the configuration of the surface platform members 12 with the nose portion 30 and leading fingers 24 results in a surface that does not have a sharp dividing line running laterally across. Such a surface is advantageous because a sharp dividing line may serve as a greater impediment to movement of articles longitudinally upon the conveyor belt 10, as is undesirable in various industrial work stations that load or unload articles from moving conveyor belts. However, the present invention may be modified in order to produce a series of surface platform members 12 having a sharp dividing line running laterally across if it is desirable for a specific application.

Figure 5:
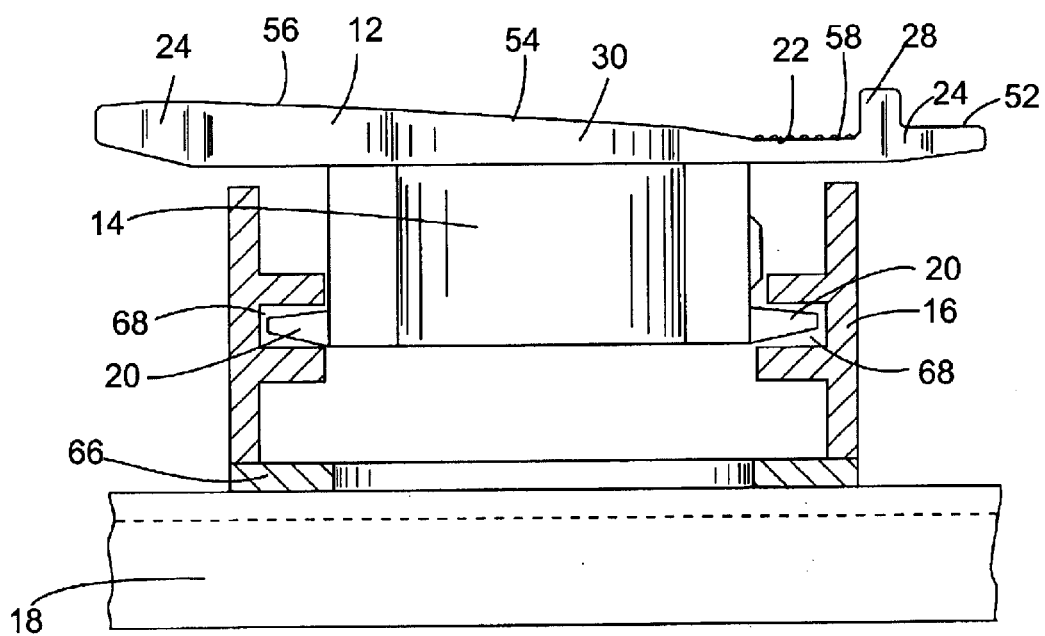
FIG. 5 is a front elevation view of another embodiment of a conveyor belt of the present invention. The drawing shows the body members having flanges on either end which ride in channels of a rail member that rest on a base. In this embodiment, the base of the rail member lays flat on the support beam, and the surface platform member itself is inclined in order to provide for a sloped surface.

The surface platform members 12 are provided with a rail member 28 and a friction gripping element 22 in the embodiment shown in FIG. 1. Referring to FIG. 5, which is taken along the line 5—5 of FIG. 1, the friction gripping element 22 is located proximate to the rail member 28. As can be seen in FIG. 5, the top or outside surface 54 of the surface platform member 12 is sloped from a location of higher elevation 56 to a location of lower elevation 58. The friction gripping element 22 is located proximate to the lower elevation 58. The purpose of having the outside surface 54 sloped is to allow for proper positioning of an object that rests upon the surface platform member 12.

The supporting structure 16 is shown in more detail in FIG. 5. The supporting structure 16 is provided with a channel 68 into which the flange 20 of a body member 14 rides. The supporting structure 16 is of suitable low resistance in order to allow the flange 20 to slide along channel 68. The supporting structure 16 is provided with a base 66 which contacts a support beam 18. The base 66 can either be attached directly, or simply supported by the support beam 18. The base 66 rests flat against the support beam 18 in FIG. 5, and the sloping of the surface platform member 12 is provided solely by the sloped outside surface 54 of the surface platform member 12.

In operation, the conveyor belt 10 may be subjected to vibration or other forces which move an article to different locations on the surface platform member 12. Having the surface platform member 12 sloped allows for an article to slide along the surface platform member 12 until it reaches the location of lower elevation 58. Thus, although movement of the article 12 cannot be completely eliminated, such movement can be controlled to the extent that the article 12 always moves to a known position.

A rail member 28 is present proximate to the location of lower elevation 58 in order to catch the object and prevent it from moving further. Additionally, rail member 28 is advantageous when the conveyor belt 10 moves through a curved section and tangential forces are imparted upon an article due to the curvature. The rail member 28 prevents the article from moving off of the surface platform member 12. It is often the case that conveyor systems which utilize such a conveyor belt 10 are only turned in one direction, and not in two directions. Such a configuration ensures that tangential forces will only be imparted in one direction because the conveyor belt 10 will only turn in one direction. However, it is to be understood that a conveyor belt 10 which curves in various directions is still within the scope of the present invention.

The friction gripping element 22 of FIG. 5 is shown as a plurality of raised projections. It should be appreciated that the raised projections can take any variety of shape such as cylindrical, pyramidal, needle shaped, or rectangular. Also, the same type of shape throughout need not be present in the friction gripping element 22. Such raised projections provide for a higher frictional surface along the friction gripping element 22 than is provided along the outside surface 54 of the surface platform member 12. Such a friction gripping element 22 further prevents an object from moving from the location of lower elevation 58 and helps to grip and maintain the article at the location of lower elevation 58.

Figure 2:
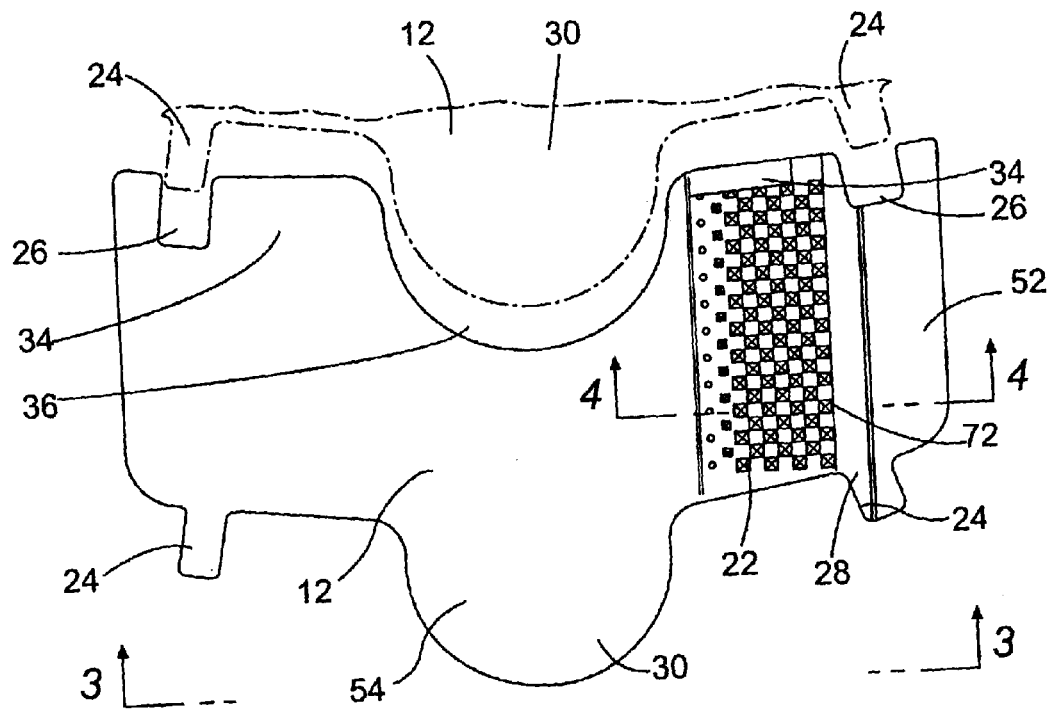
FIG. 2 is a top plan view of another embodiment of a surface platform member of the present invention. The drawing shows a friction gripping element that is a plurality of raised projections and is located next to a rail member.
Figure 4:
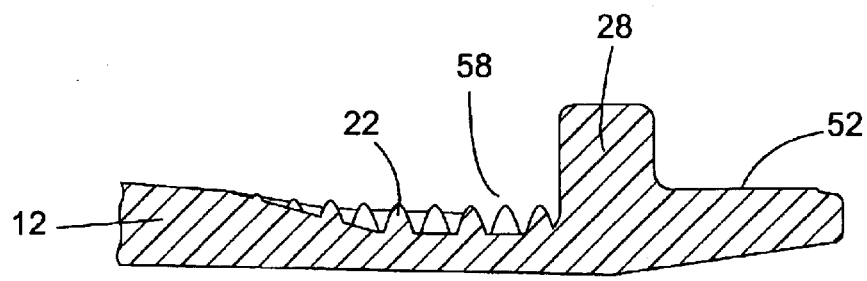
FIG. 4 is a cross sectional view taken along line 4—4 of the embodiment shown in FIG. 2. The drawing shows one embodiment of the friction gripping element which may be a series of raised projections.

FIG. 2 shows an alternative embodiment of a conveyor belt 10 in accordance with the present invention. A surface platform member 12 is shown having a void 36 and two trailing grooves 26. A portion of a second surface platform member 12 is drawn in phantom and is shown with a nose portion 30 that mates with the void 36 and two leading fingers 24 that may mate with the trailing grooves 26. Such a configuration is advantageous in allowing curvature of the conveyor belt 10 and eliminating the use of a single sharp dividing edge between surface platform members 12. The surface platform member 12 is provided with a friction gripping element 22 in the form of a plurality of raised projections 72. As can be seen in FIG. 2 and FIG. 4, the raised projections 72 are pyramid shaped, and are sized to have a height equal to about that at the point where the outside surface 54 meets the friction gripping element 22. The friction gripping element 22 is located next to the rail member 28. An edge 52 is provided on the opposite side of rail member 28 from the friction gripping element 22.

Although shown as a plurality of raised projections 72, the friction gripping element 22 can have any number of other various configurations. For instance, the friction gripping element 22 may be made of a series of cuts or grooves in the outside surface 54 of the surface platform member 12.

Figure 3:
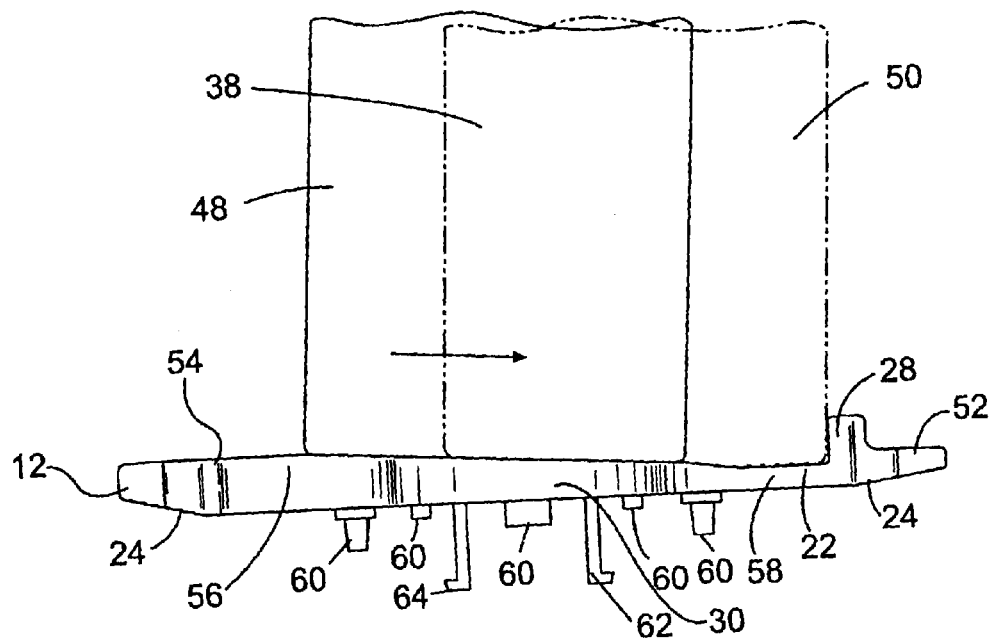
FIG. 3 is a front elevation view taken along line 3—3 of the embodiment shown in FIG. 2. An article is shown on the outside surface of the surface platform member and is drawn in a first position and a second position.

As seen in FIG. 3, an article 38 may rest upon the outside surface 54 of the surface platform member 12. The article 38 is shown moving from a first position 48 to a second position 50. This movement is due primarily to the sloped surface of the outside surface 54, which slopes from a location of higher elevation 56 to a location of lower elevation 58. The article 38 may move between positions 48 and 50 simply by gravity alone, when the conveyor belt 10 is stationary. In addition, the article 38 may move due to a combination of gravity, vibration of the conveyor belt 10 and turning of the conveyor belt 10 along a curved section of supporting structure 16. Additionally, article 38 may move along the outside surface 54 due to being contacted by machinery along the path of the conveyor belt 10. The friction gripping element 22 is located at the location of lower elevation 58 in order to help secure the article 38 at this position and prevent it from moving back up the sloped outside surface 54.

In addition, the friction gripping element 22 helps prevent articles 38 from moving backwards along the surface platform member 12 when the conveyor belt 10 goes up an incline.

The embodiment of the conveyor belt 10 shown in FIG. 3 is provided with a plurality of pegs 60 along the lower surface of the surface platform member 12. The pegs 60 can be of any shape, for example substantially cylindrical or substantially rectangular in shape, either integral with or connected to the surface platform member 12. The pegs 60 fit into corresponding slots (not shown) in the body members 14 which comprise the conveyor belt 10. The surface platform member 12 is also provided with two spring tabs 62. These spring tabs 62 may be resilient, substantially rectangular, and integral with the surface platform member 12. The spring tabs 62 are provided with a detent latching member 64 on one end. The detent latching member 64 may be received in a cavity (not shown) with a mating detent member (not shown) in the body member 14 in order to securely fasten the surface platform member 12 onto the body member 14. However, it is to be understood that various ways of attaching either permanently or releasably the surface platform member 12 onto the body members 14 can be employed in the present invention.

Figure 6:
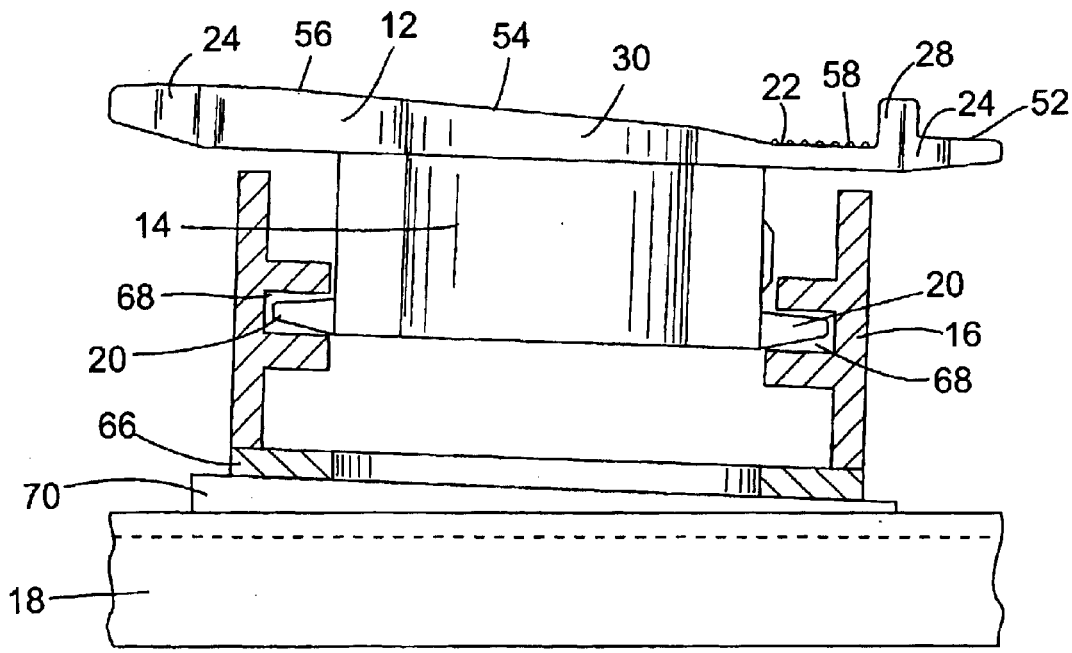
FIG. 6 is a front elevation view of another embodiment of a conveyor belt in accordance with the present invention. A shim is placed between the base of the rail member and the support beam to further slope the surface platform member.

FIG. 6 shows an alternative embodiment of a conveyor belt 10 in accordance with the present invention. Here, a shim 70 is inserted between the support beam 18 and the base 66 of supporting structure 16. The shim 70 has a sloping surface that contacts the base 66. The slope of shim 70 runs in the same direction as does the sloped outside surface 54 of the surface platform member 12 from the location of higher elevation 56 to the location of lower elevation 58. The sloping of shim 70 therefore increases the slope of the outside surface 54. Such an increase in slope can be desirable if a heavier object is placed on the conveyor belt 10, which would require a larger slope in order to move from the location of higher elevation 56 to the location of lower elevation 58. Such a shim 70 may be placed under any number of support beams 18 and at any desired location in order to provide for a desired slope through a particular section of the conveyor belt 10.

Figure 7:
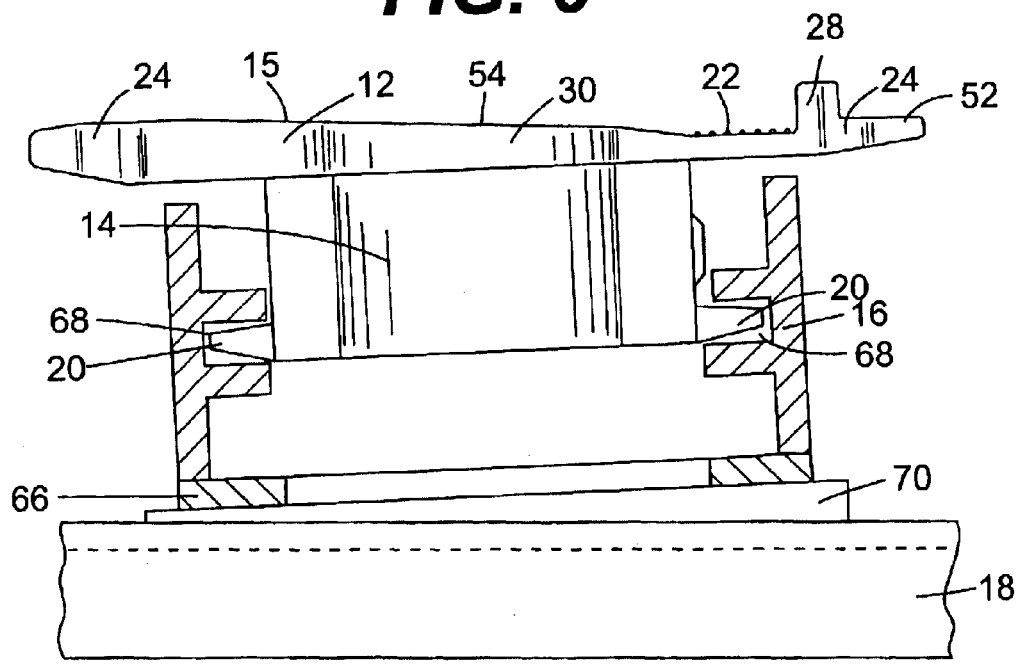
FIG. 7 is a front elevation view of an alternative embodiment of the present invention. The drawing is similar to the embodiment shown in FIG. 6 with the exception of having a shim angled in the opposite direction in order to negate the sloping effect of the surface platform member, and results in a surface that is essentially parallel to the top of the support beam.

FIG. 7 shows an embodiment of the conveyor belt 10 in accordance with the present invention also having a shim 70 placed between the support beam 18 and the base 66 of supporting structure 16. Here, however, the slope of shim 70 runs against the slope of the outside surface 54 of the surface platform member 12. The slope of shim 70 therefore cancels the sloping effect of the outside surface 54 of surface platform member 12. Such a result may be desirable for various reasons, and may be incorporated into a specific length of the conveyor belt or on the entire conveyor belt 10. For example, in accumulator systems it is often the case that only one conveyor belt 10 may be used, and a sloped surface is not desired when the articles are moving up an accumulator system. However, when moving down an accumulator, a sloped surface is desired in order to move an article 12 to a particular position on the conveyor belt 10.

Figure 8:
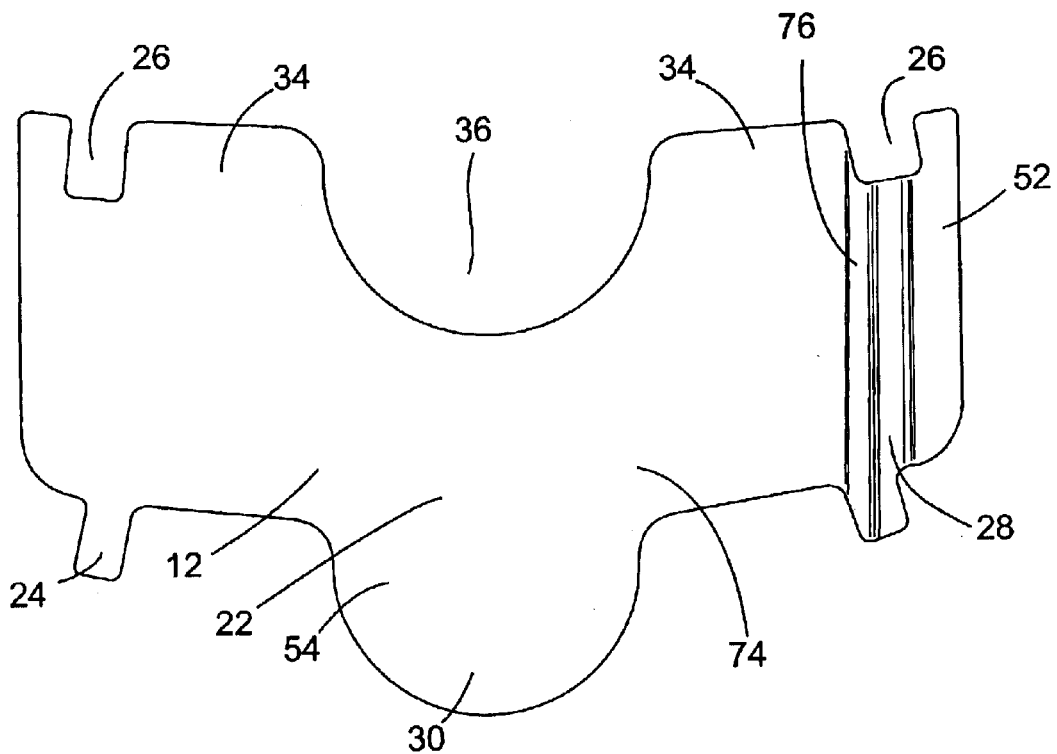
FIG. 8 is a top plan view of an alternative embodiment of a surface platform member of a conveyor belt. The drawing shows a space that is present between the rail member and the friction gripping element.
Figure 9:
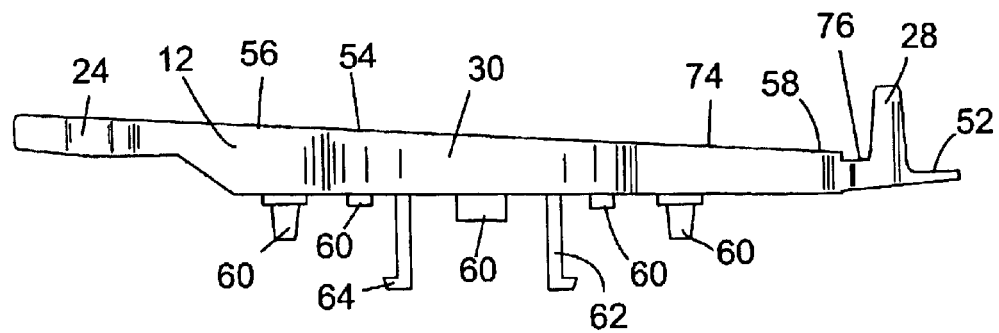
FIG. 9 is a front elevation view of the embodiment shown in FIG. 8.

FIG. 8 shows an alternative embodiment of a surface platform member 12 for use on a conveyor belt 10 in accordance with the present invention. Here, the outer surface 54 is provided with a friction enhancing surface 74 which acts as the friction gripping element 22. In one embodiment of the present invention this surface 74 may be rubber or a rubber-like substance, however it is to be understood that the invention is not limited to simply a rubber surface. The outer surface 54 is sloped from a location of higher elevation 56 to a location of lower elevation 58 as is shown in FIG. 9. The friction enhancing surface 74 acts to slow down movement of an article along the outside surface 54, yet still allows for the article to move down onto the location of lower elevation 58. The friction enhancing surface 74 also prevents articles from sliding backwards along the conveyor belt 10 as the conveyor belt 10 moves upwards on an incline. A space 76 is provided between the rail member 28 and the friction enhancing surface 74. Space 76 is provided to allow for an article to be more easily removed from the location of lower elevation 58, and not wedged against the rail member 28 and a friction enhancing surface 74 that extends up to and against the rail member 28. The surface platform member 12 in the embodiment shown in FIG. 9 is also provided with a plurality of pegs 60 and a pair of detent latching members on a pair of spring tabs 62. The description of these parts is as explained above.

As can be seen, the embodiments of the invention include a surface platform member 12 having a sloped surface in order to properly position an article on the surface 54 of the surface platform member 12. Further, shims may be used to augment or cancel the sloped surface depending upon the desired application.

It should be understood that the invention includes various modifications that can be made to the embodiments of the conveyor belt described as come within the scope of the appended claims and their equivalents.

What is claimed is:

1. A link for use in a conveyor belt for transporting objects, said link comprising:

a body member; and a surface platform me bar disposed at one side of said body member such that said surface platform member is stationary with respect to said body member, an outside surface of said surface platform member sloping from a first location of higher elevation to a second location of lower elevation; and a rail member located on said surface platform member proximate to said second location of lower elevation, said surface platform member adapted to support an object being transported by the conveyor belt.

2. The link as in claim 1, further comprising a friction gripping element located on and projecting from said outside surface of said surface platform member.

3. The link as in claim 2, wherein said friction gripping element is located at said second location of lower elevation and proximate to said rail member.

4. The link as in claim 2, wherein said friction gripping element is located between said first location of higher elevation and said second location of lower elevation.

5. The link as in claim 2, wherein said friction gripping element comprises a series of cuts made in said outside surface of said surface platform member.

6. The link as in claim 2, wherein said friction gripping element comprises a plurality of raised projections.

7. The link as in claim 2, wherein said friction gripping element comprises a series of grooves.

8. The link as in claim 7, wherein said projections are pyramid shaped.

9. The link as in claim 1, wherein said rail member is located proximate to an edge of said surface platform member.

10. The link as in claim 1, wherein said surface platform member is separate from said body member, said surface platform member being securely removably fastened to said body member such that said surface platform member is stationary with respect to said body member.

11. The link as in claim 10, wherein said surface platform member comprises at least one peg extending from a lower surface and mating into a cavity in said body member.

12. The link as in claim 10, wherein said surface platform member comprises a pair of resilient integral spring tabs protruding from a lower surface thereof, said spring tabs defining a detent latching member to be received in a cavity with a mating detent member in said body member, said spring tabs engaged in a snap-lock fitting engagement to retain said surface platform member on said body, member.

13. The link as in claim 10, wherein said body member is further configured with an inclined surface to cause additional sloping of said surface platform member.

14. The link as in claim 10, wherein said body member is further configured with an inclined surface to negate the sloping of said surface platform member.

15. A link for use in a conveyor belt for transporting objects, said link comprising:

a body member:

a surface platform member disposed at one side of said body member, an outside surface of said surface platform member sloping from a first location of higher elevation to a second location of lower elevation; and a rail member located on said surface platform member proximate to said second location of lower elevation, said surface platform member adapted to support an object being transported by the conveyor belt; and wherein said body member comprises a leading nose portion and integral trailing set of bifurcated legs.

16. The link as in claim 15, wherein said body member further comprises sprocket receiving drive indentations disposed on opposite lateral sides thereof.

17. A platform member removably attachable to a body member on an individual link in a conveyor belt, said platform member comprising:

an outside surface sloping from a first location of higher elevation to a second location of lower elevation;

a rail member located on said surface platform member proximate to said second location of lower elevation, said surface platform member adapted to support an object being transported by the conveyor belt; and a releasable attaching mechanism operatively disposed to generally non-movably secure said platform member to a body member such that said platform member is stationary with respect to the body member yet allows ready removal of said platform member from the body member.

18. The platform member as in claim 17, further comprising a friction gripping element location and projecting from said outside surface.

19. The platform member as in claim 18, wherein said friction gripping element is located at said second location of lower elevation and proximate to said rail member.

20. The platform member as in claim 18, wherein said friction gripping element is located between said first location of higher elevation and said second location of lower elevation.

21. The platform member as in claim 18, wherein said friction gripping element comprises series of cuts made in said outside surface.

22. The platform member as in claim 18, wherein said friction gripping element comprises is a plurality of raised projections.

23. The platform member as in claim 18, wherein said friction gripping element comprises series of grooves defined in said outside surface.

24. The platform member as in claim 17, wherein said rail member is located proximate to an edge of said platform member.

25. The platform member as in claim 17, wherein said attaching mechanism comprises at least one peg extending from a lower surface of said platform member for mating into a cavity in a body member.

26. The platform member as in claim 17, wherein said attaching mechanism comprises a pair of resilient integral spring tabs protruding from a lower surface of said platform member, said spring tabs defining a detent latching member to be received in a cavity with a mating detent member in a body member.

* * * * *